(12) United States Patent
Nakajima et al.

(10) Patent No.: US 6,530,594 B1
(45) Date of Patent: Mar. 11, 2003

(54) PLACEMENT STRUCTURE FOR HEAD-PROTECTING AIR BAG BODY

(75) Inventors: Hiroki Nakajima, Nagoya (JP); Toshimitu Watanabe, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/706,789

(22) Filed: Nov. 7, 2000

Related U.S. Application Data (63) Continuation of application No. 09/145,216, filed on Sep. 1, 1998, now abandoned.

(30) Foreign Application Priority Data

Sep. 26, 1997 (JP) .............................. 9-261743

(51) Int. Cl.[7] .............................................. B60R 21/22
(52) U.S. Cl. ............................... 280/730.2; 280/728.2; 280/743.1
(58) Field of Search .......................... 280/730.2, 728.1, 280/728.2, 730.1, 743.1; 297/216.1, 216.12

(56) References Cited

U.S. PATENT DOCUMENTS

| | | | |
|---|---|---|---|
| 5,265,903 A | 11/1993 | Kuretake et al. | |
| 5,322,322 A | 6/1994 | Bark et al. | |
| 5,462,308 A | 10/1995 | Seki et al. | |
| 5,480,181 A | 1/1996 | Bark et al. | |
| 5,540,459 A | 7/1996 | Daniel | |
| 5,588,672 A | 12/1996 | Karlow et al. | |
| 5,605,346 A | 2/1997 | Cheung et al. | |
| 5,660,414 A | 8/1997 | Karlow et al. | |
| 5,755,457 A | 5/1998 | Specht | |
| 5,788,270 A | 8/1998 | Haland et al. | |
| 5,791,683 A | 8/1998 | Shibata et al. | |
| 5,884,937 A | 3/1999 | Yamada | |

FOREIGN PATENT DOCUMENTS

| | | |
|---|---|---|
| DE | 4134995 C1 | 3/1993 |
| DE | 296 13 781 | 11/1996 |
| DE | 196 22 231 | 12/1997 |
| EP | 0 841 221 | 5/1998 |
| GB | 2261636 | 5/1993 |
| JP | 2-155855 | 6/1990 |
| JP | 2-158444 | 6/1990 |
| JP | 3-276844 | 12/1991 |
| JP | 6-25057 | 9/1992 |
| JP | 5-038993 | 2/1993 |
| JP | 5-193433 | 8/1993 |
| JP | 6-227340 | 8/1994 |
| JP | 406227340 | 8/1994 |
| JP | 7-117605 | 5/1995 |
| JP | 9-207701 | 8/1997 |
| JP | 9-249089 | 9/1997 |
| WO | 96/26087 | 8/1996 |

*Primary Examiner*—F. Zeender
(74) *Attorney, Agent, or Firm*—Pillsbury Winthrop LLP (57) ABSTRACT

A jump-up stand is disposed below a folded air bag body and is also provided over a region from a position near a front side of a center pillar to the center pillar. The jump-up stand is formed from a plate material which is bent to have a substantially L-shaped cross sectional configuration and includes a wall portion extending toward an upper end of a center pillar garnish. Accordingly, when the air bag body expands, the air bag body expands toward the interior of a vehicle along the wall portion of the jump-up stand so as to prevent large load from acting on the upper end of the center pillar garnish.

31 Claims, 7 Drawing Sheets

PLACEMENT STRUCTURE FOR HEAD-PROTECTING AIR BAG BODY

This is a continuation of application Ser. No. 09/145,216, filed Sep. 1, 1998, now abandoned.

BACKGROUND OF THE INVENTION

1. Field of the Invention

The present invention relates to a placement structure for a head-protecting air bag body, wherein a head-protecting air bag body accommodated along a pillar portion and a roof side rail portion unfolds similarly to a curtain due to gas jetted by an inflator when a predetermined high load acts on a side portion of a vehicle body.

2. Description of the Related Art

There has already been proposed a head-protecting air bag device in which, in order to improve the ability to protect the head of a vehicle occupant seated in a front seat when a predetermined high load acts on a side portion of a vehicle body, an air bag body accommodated in a folded state over a region from a front pillar portion to a roof side rail portion is caused to unfold along a side window glass similarly to a curtain. This type of head-protecting air bag device is disclosed in International Publication No. WO 96/26087 and will be described hereinafter.

Figure 7:
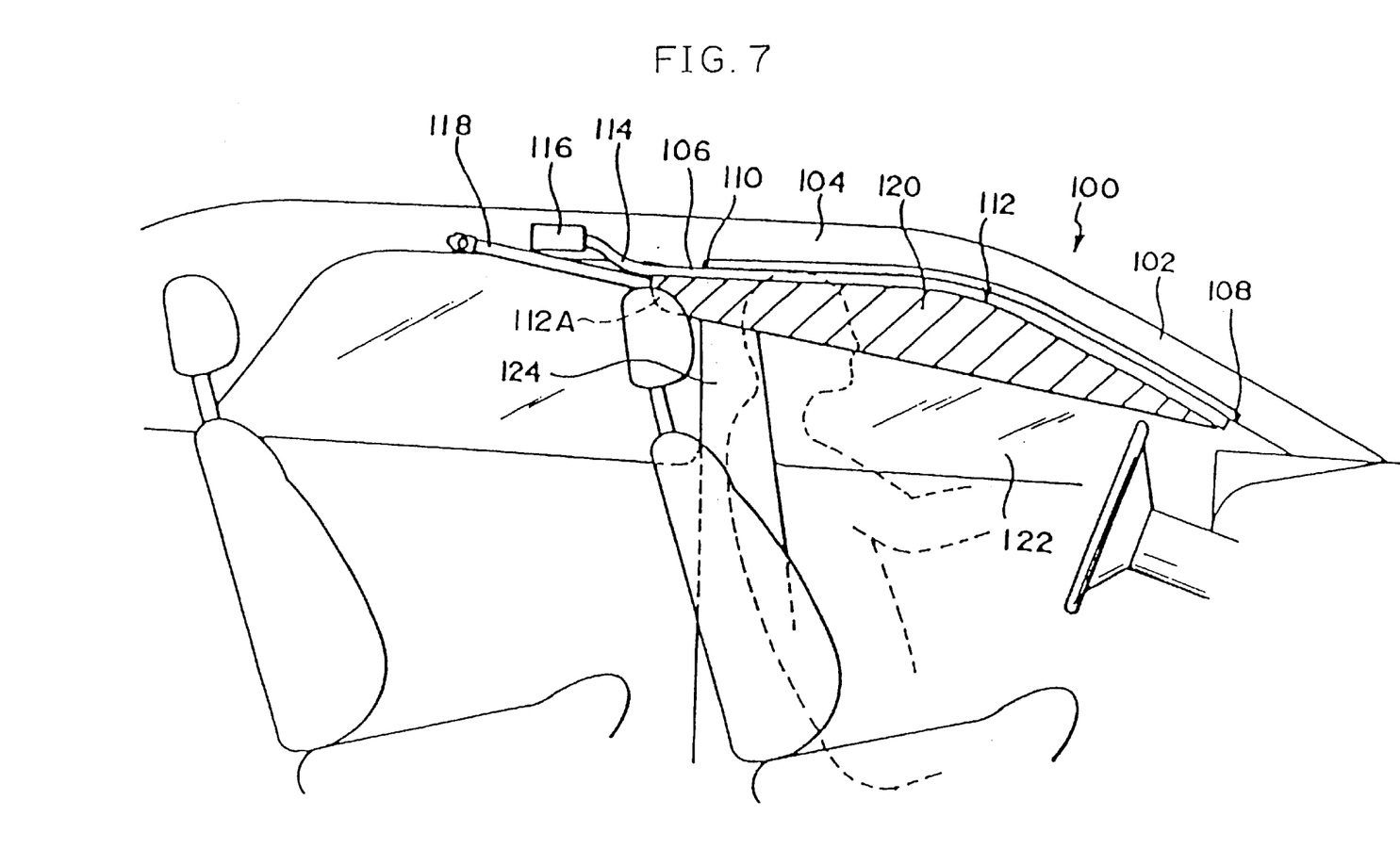
FIG. 7 is a side view which schematically shows a state in which expansion of an air bag body in a conventional head-protecting air bag device is completed.

As shown in FIG. 7, a head-protecting air bag device 100 is structured to include, as main components, an elongated duct 106 disposed to extend from a front pillar portion 102 to a roof side rail portion 104, an air bag body 112 accommodated in the duct 106 in a folded manner and fixed to a vehicle body at a front-end fixed point 108 and at a rear-end fixed point 110, an inflator 116, which is connected via a hose 114 to the rear end of the duct 106 and jets out gas when a predetermined high load acts on the side portion of the vehicle body, and a band-shaped strap 118 whose one end is fixed to the vehicle body and other end is fixed to the rear end of the air bag body 112. The air bag body 112 is formed by a plurality of cells 120, which are each formed substantially into a cylinder and are disposed with longitudinal directions thereof substantially coinciding with the vertical direction of the vehicle, being connected together.

According to the above-described structure, when a predetermined high load acts on the side portion of the vehicle body, gas is ejected from the inflator 116. The ejected gas flows into each cell 120 of the folded air bag body 112 via the hose 114 and the duct 106. As a result, each cell 120 expands substantially into a cylindrical configuration with the longitudinal direction thereof substantially coinciding with the vertical direction of the vehicle. The air bag body 112 is thereby inflated similarly to a curtain along a window glass 122. Further, the rear end of the air bag body 112 is connected via the strap 118 to the vehicle body, and therefore, the rear-end side of the air bag body 112 is reliably disposed at an inner side of the upper portion of a center pillar portion 124.

However, in this head-protecting air bag device 100, the air bag body 112 is disposed over a region from the front pillar portion 102 to the roof side rail portion 104, and therefore, the air bag body 112 is covered by, for example, a front pillar garnish and a roof head lining. As a result, when the air bag body unfolds, the front pillar garnish and the roof head lining deform, and the air bag body comes out from the respective deformed portions of the front pillar garnish and the roof head lining so as to expand toward the interior of the vehicle. Further, in the head-protecting air bag device 100, a rear end portion 112A of the air bag body 112 extends to the rear side of the center pillar portion 124. For this reason, there is a possibility that the air bag body 112, which inflates to unfold toward the interior of the vehicle by deforming the end of the roof head lining, contacts an upper end of a garnish for the center pillar portion 124 or falls into a region between the garnish for the center pillar portion 124 and a body panel or catches on the upper end of the garnish for the center pillar portion 124, thereby resulting in large load acting on the upper end of the garnish.

SUMMARY OF THE INVENTION

In view of the above-described circumstances, it is an object of the present invention to provide a placement structure for a head-protecting air bag body, in which a head-protecting air bag body expands so as not to apply large load to an upper end of a center pillar garnish.

A first aspect of the present invention is a placement structure for a head-protecting air bag body which expands similarly to a curtain over a region from a pillar to a roof side rail, comprising: guide means which controls a direction in which the air bag body expands so as to prevent application of large load by the air bag body to an upper end of a center pillar garnish during expansion of the air bag body.

Accordingly, the guide means can prevent application of large load by the air bag body to the upper end of the center pillar garnish during expansion of the air bag body.

A second aspect of the present invention is that, in the placement structure for a head-protecting air bag body according to the first aspect, the guide means is provided in the roof side rail disposed close to the upper end of the center pillar garnish and is formed from a plate material having a wall portion extending from the roof side rail to the upper end of the center pillar garnish.

Accordingly, in addition to the effect of the first aspect, it suffices that slight structural change is made, and the structure of the present embodiment can easily accommodate a case with or without the air bag body mounted and manufacture thereof is simple. Further, there is no possibility that each strength of the pillar and the roof side rail deteriorate.

A third aspect of the present invention is that, in the placement structure for a head-protecting air bag body according to the second aspect, the plate material is a metal plate which can easily be plastically deformable.

Accordingly, in addition to the effect of the second aspect, even if the head of a vehicle occupant abuts against the plate material at the time of collision, the plate material formed from a metal plate easily plastically deforms so as to alleviate shock to be applied to the head of the vehicle occupant.

A fourth aspect of the present invention is that, in the placement structure for a head-protecting air bag body according to the first aspect, the guide means is formed integrally with the upper end of the center pillar garnish and includes a wall portion extending toward the roof side rail.

Accordingly, in addition to the effect of the first aspect, reduction in cost can be achieved with no increase in the number of parts. Further, by devising the shape of the guide means, the guide means can be used as the connection holding means for the roof head lining.

DESCRIPTION OF THE PREFERRED EMBODIMENTS

A description will be hereinafter given of a placement structure for a head-protecting air bag body according to a first embodiment of the present invention with reference to FIGS. 1 to 4.

It should be noted that arrows "FR", "UP", and "IN" shown in the accompanying drawings respectively represent the forward direction of a vehicle, the upward direction thereof, and an inward direction along the transverse direction of the vehicle.

Figure 4:
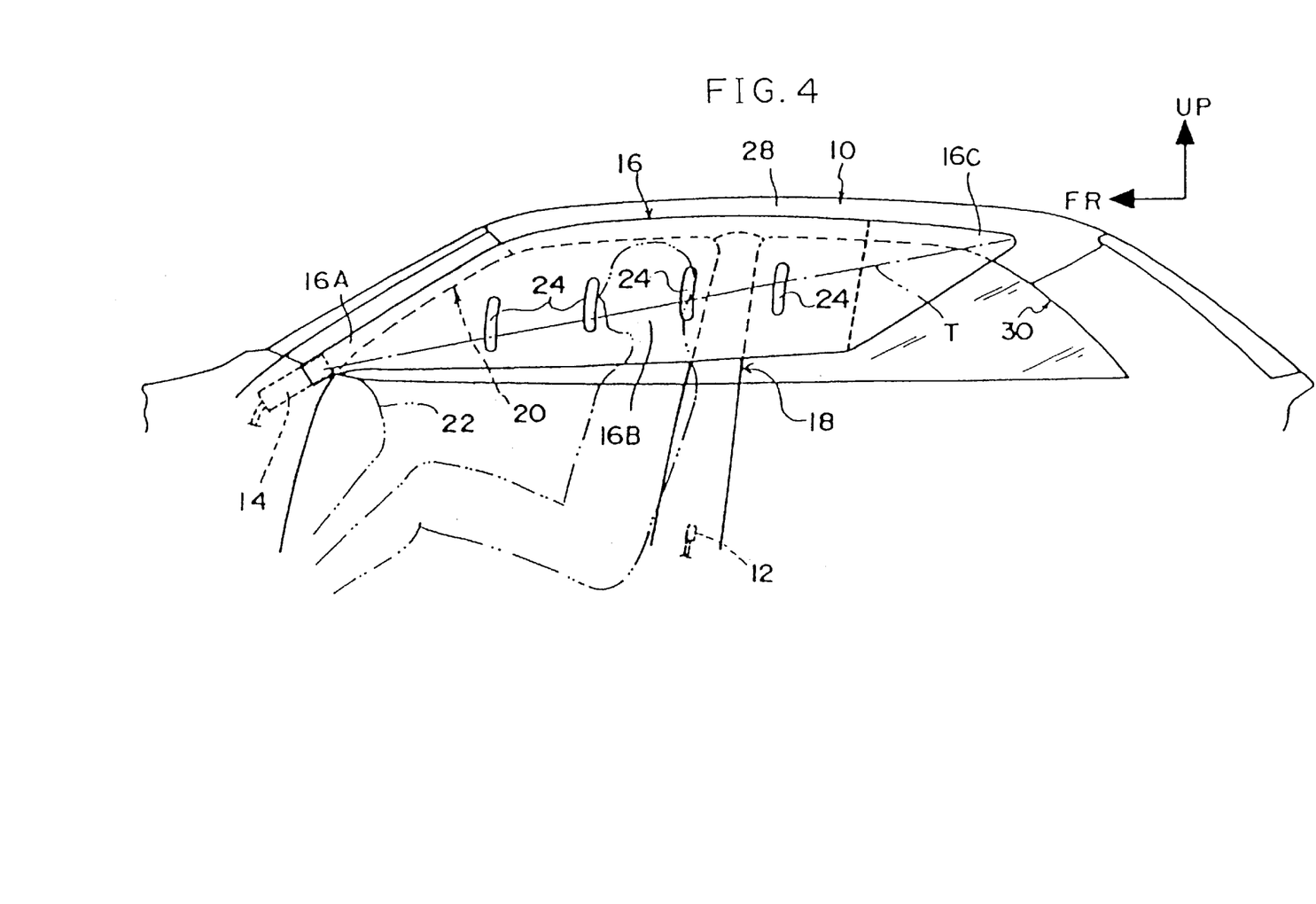
FIG. 4 is a side view which schematically shows a state in which expansion of an air bag body is completed on a vehicle-interior side surface at the side of a driver's seat, to which the placement structure for a head-protecting air bag body according to the first embodiment of the present invention is applied.

As shown in FIG. 4, a head-protecting air bag device 10 of the present embodiment is structured to include, as main components, a sensor 12 for detecting the state of side collision of the vehicle, a cylindrical inflator 14 which ejects gas upon operation thereof, and an air bag body 16. The sensor 12 is disposed in the vicinity of the lower end of a center pillar (B pillar) 18. When side-collision load of a predetermined value or more acts on a side portion of a vehicle body, the sensor 12 detects the state of a side collision of the vehicle.

The inflator 14 is disposed near a portion where a front pillar (A pillar) 20 and an instrument panel 22 are jointed to one another, and is connected to the above-described sensor 12. Accordingly, when the state of a side collision of the vehicle is detected by the sensor 12, the inflator 14 is operated.

A plurality of non-expanding portions 24, whose longitudinal direction coincides with the vertical direction of the air bag body, are formed at predetermined intervals at a vertical direction intermediate portion of the air bag body 16 as seen in side view in such a manner as to cross a tension line T which connects a front-side fixed point and a rear-side fixed point of the air bag body 16. At the time of expansion of the air bag body, these non-expanding portions 24 allow formation of a plurality of cylindrical expanding portions which are disposed substantially parallel to one another and cross the tension line T.

The front end 16A of the air bag body 16 is disposed at a position where the inflator 14 is provided, so as to allow gas ejected from the inflator 14 to flow into the air bag body.

An upper end edge of an intermediate portion 16B is disposed along the front pillar 20 and a roof side rail 28, and an upper end edge of the rear end 16C is disposed near a quarter pillar (C pillar) 30.

Figure 3:
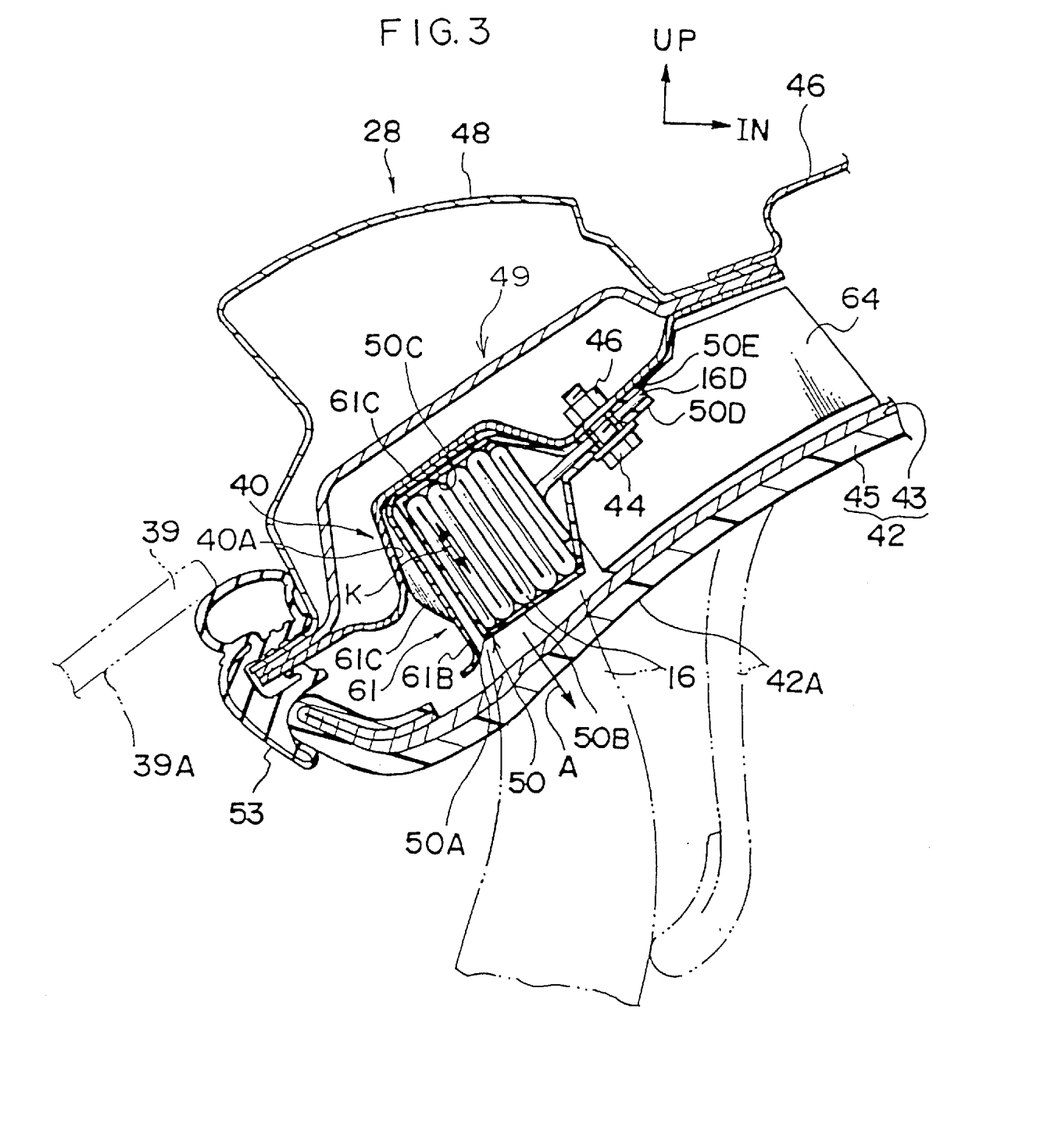
FIG. 3 is an enlarged cross-sectional view taken along line 3—3 in FIG. 1.

As shown in FIG. 3, the air bag body 16 is accommodated in a region from a front pillar garnish 26 to an outer side portion 42A of a roof head lining 42 in the transverse direction of the vehicle in such a manner as to be elongated by being folded in a bellows-like shape substantially in the vertical direction of the vehicle.

As shown in FIG. 3, the roof side rail 28 is formed by a rail outer panel 48 having a substantially hat-shaped cross-sectional configuration and projecting by a relatively large amount in the outward direction of the vehicle, a rail inner panel 40 which slightly projects toward the rail outer panel 48, and a rail reinforcement 49 having a substantially hat-shaped cross-sectional configuration along the rail outer panel 48 and interposed between the rail outer panel 48 and the rail inner panel 40. Respective ends of the rail outer panel 48, the rail inner panel 40, and the rail reinforcement 49 at the both sides thereof are joined together by welding to form a closed cross-sectional configuration. Further, the upper end of the roof side rail 28 thus formed is connected by welding to an outer end of a roof panel 46 in the transverse direction of the vehicle. An opening weather strip 53 is fitted to the lower end of the roof side rail 28.

The air bag body 16 is folded within a case 50 in a direction substantially perpendicular to an interior-side surface 39A of a door glass 39 (i.e., in the directions indicated by double-headed arrow K in FIG. 3) and the case 50 is disposed between the rail inner panel 40 and the roof head lining 42. When the air bag body 16 expands, a corner portion 50A formed at the lower end of the case 50 at the inner side in the transverse direction of the vehicle is broken, due to the expansion force of the air bag body 16, with a V-shaped notch, which is formed further toward the inner side of the case 50 than the corner portion 50A, serving as a breakage starting point. As a result, a lid portion 50B opens toward the interior side of the vehicle with respect to a base portion 50C.

Further, in the case 50, an upper wall portion 50D of the lid portion 50B and an upper wall portion 50E of the base portion 50C are disposed parallel to each other with an upper end portion 16D of the air bag body 16 interposed therebetween. A through hole is formed in each of the upper wall portions 50D and 50E of the case 50. The case 50 is, together with the air bag body 16, fixed to an interior-side portion of the rail inner panel 40 by a bolt 44 penetrating the through holes formed in the upper wall portions 50D and 50E and a mounting hole formed in the upper end portion 16D of the air bag body 16, and also by a nut 46 which is screwed onto the bolt 44.

The roof head lining 42 is made of resin and is formed by a base material 43 and an outer cover 45. When the air bag body 16 expands, the vehicle transverse direction outer side portion 42A of the roof head lining 42 deforms, as indicated by the two-dot chain line in FIG. 3, toward the interior side of the vehicle due to the expansion force of the air bag body 16, and the air bag body 16 thereby expands from the opening toward the interior of the vehicle. Reference numeral 64 shown in FIG. 3 designates a shock absorbing material.

Figure 2:
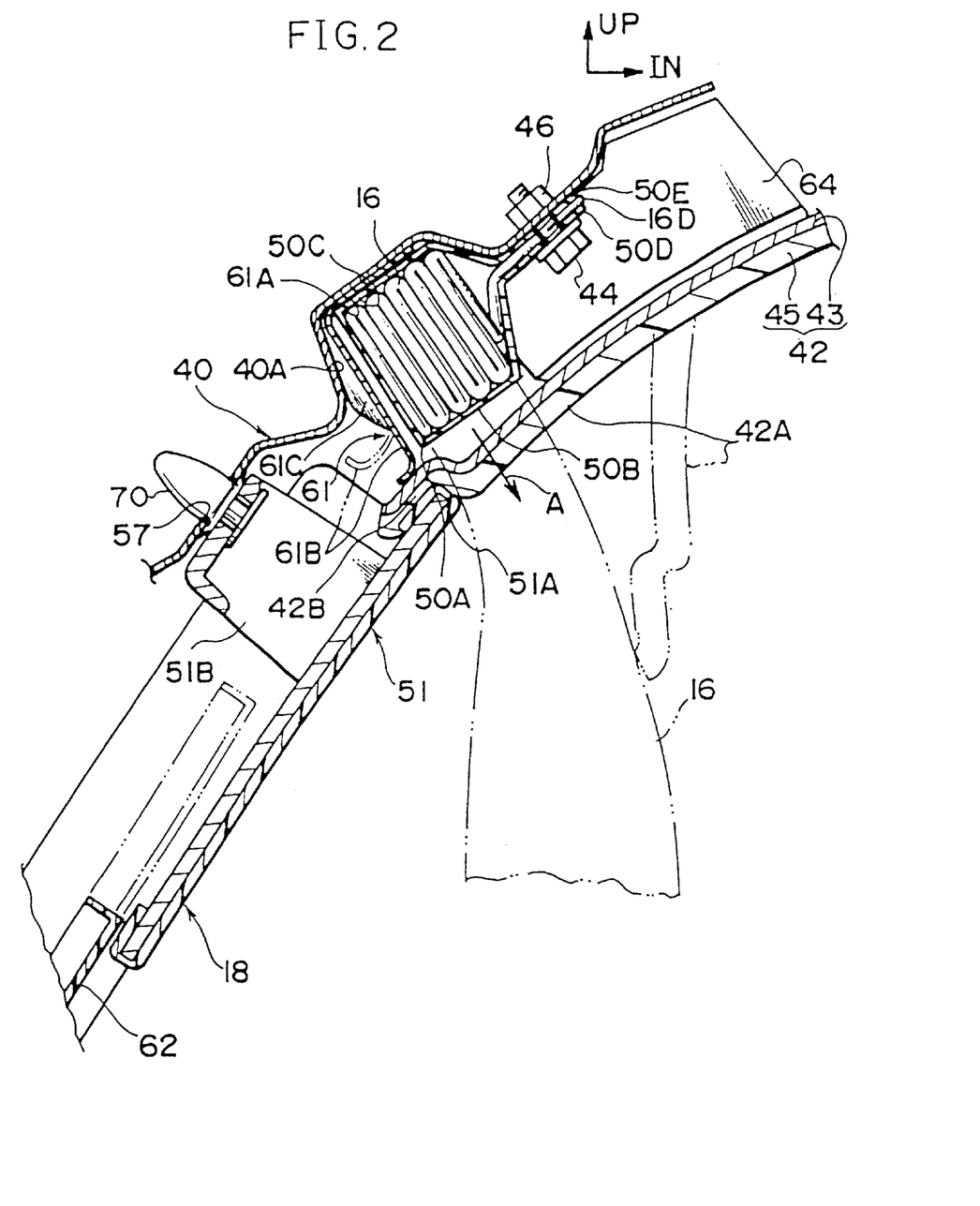
FIG. 2 is an enlarged cross-sectional view taken along line 2—2 in FIG. 1.

Further, as shown in FIG. 2, during expansion of the air bag body, the vehicle transverse direction outer side portion 42A of the roof head lining 42 is pushed open above the center pillar 18 as indicated by the two-dot chain line from a portion, in which the roof head lining 42 formed below the lid portion 50B of the case 50 and the upper end 51A of the center pillar garnish 51 are engaged with each other, due to the swelling pressure of the air bag body 16, and the air bag body 16 thereby comes out from the widened opening so as to expand toward the interior of the vehicle.

Meanwhile, the center pillar garnish 51 is made of resin and is formed by a base material and a surface cover. A mounting seating 51B is disposed upright on a rear surface of an upper portion of the center pillar garnish 51. A clip 70 is engaged with and fastened to a top portion of the seating 51B and is also fixed to a mounting hole 57 formed in the rail inner panel 40. Reference numeral 62 designates a slide plate.

Figure 1:
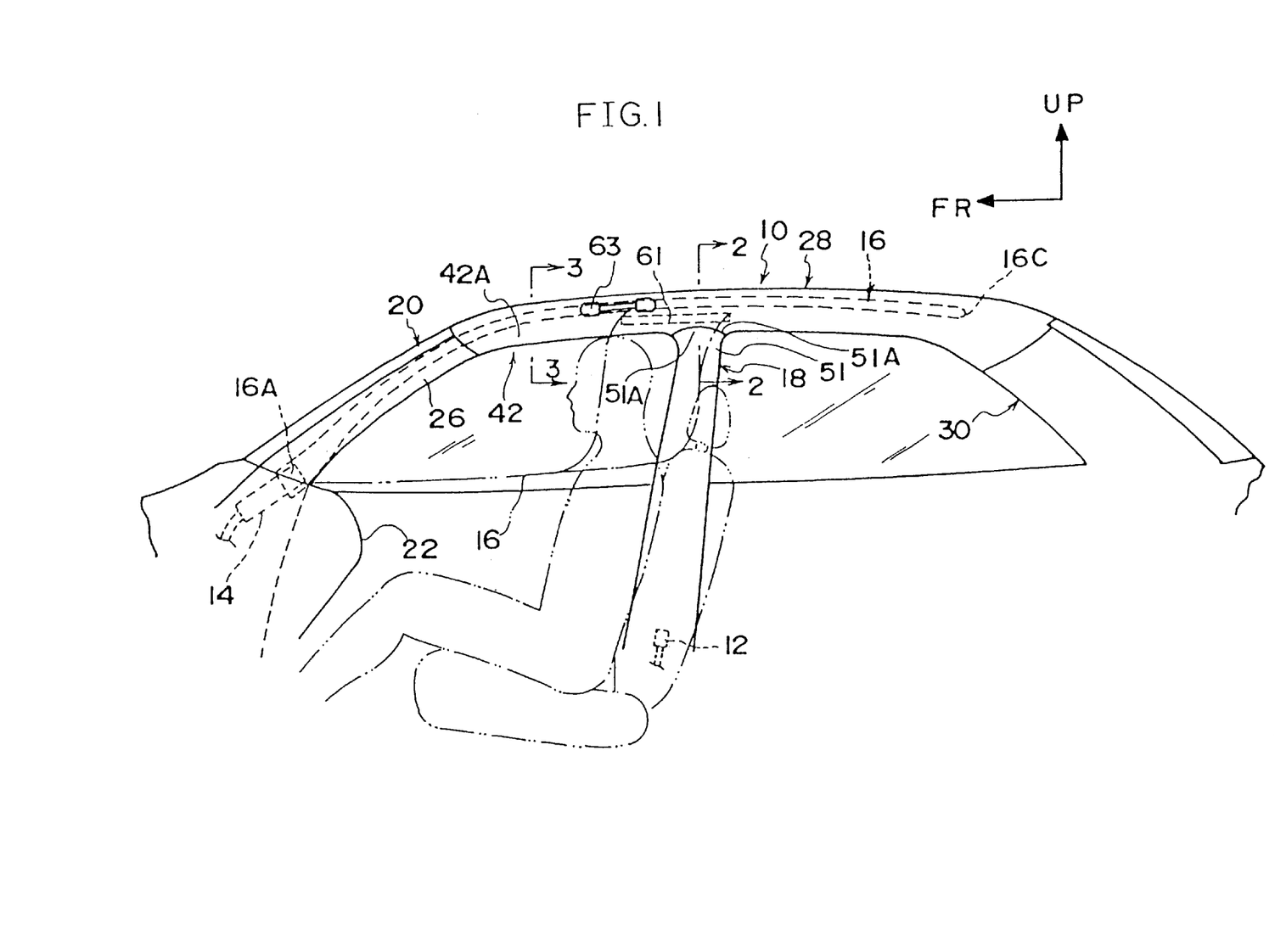
FIG. 1 is a side view which schematically shows a state in which an air bag body is accommodated on a vehicle-interior side surface at the side of a driver's seat, to which a placement structure for a head-protecting air bag body according to a first embodiment of the present invention is applied.

As shown in FIG. 1, a jump-up stand 61 serving as guide means is disposed below the folded air bag body 16. The jump-up stand 61 is provided in a region which faces the upper end 51A of the center pillar garnish 51, preferably in a region from a position overlapping with an assist grip 63 of the roof side rail 28 mounted at a front side of the center pillar 18 or a card holder to the upper end 51A of the center pillar garnish 51.

As shown in FIG. 2, the jump-up stand 61 is bent to have a substantially L-shaped cross-sectional configuration as seen from the front of the vehicle and is formed from a plate material which is easily plastically deformable (for example, an iron plate having a thickness of 0.8 mm). The jump-up stand 61 includes a mounting portion 65A fixed by welding or the like to the rail inner panel 40 disposed close to the upper end 51A of the center pillar garnish 51 and also includes a wall portion 61B extending from the lower end of the mounting portion 61A to the upper end 51A of the center pillar garnish 51. An edge portion 42B of the roof head lining 42 is interposed between the end of the wall portion 61B and the upper end 51A of the center pillar garnish 51.

A bead 61C which abuts against the wall portion 40A of the rail inner panel 40 is formed in the wall portion 61B of the jump-up stand 61, so as to prevent the wall portion 61B of the jump-up stand 61 from falling down due to the swelling pressure of the air bag body 16 during expansion of the air bag body 16. Accordingly, when the air bag body 16 expands, the air bag body 16 inflates toward the interior of the vehicle (i.e., in the direction indicated by arrow A in FIGS. 2 and 3) along the wall portion 61B of the jump-up stand 61.

Next, operation of the present embodiment will be described.

In the present embodiment, when a side-collision load of a predetermined value or more acts on the side portion of the vehicle body, the occurrence of a side surface collision of the vehicle is detected by the sensor 12. The inflator 14 then operates to eject a predetermined amount of gas. As a result, the air bag body 16 starts to expand, and then further expands similarly to a curtain down to beneath the roof side rail 28 over a region from the front side to the rear side of the vehicle while pushing open the pillar garnish 26 of the front pillar 20 and the vehicle transverse direction outer side portion 42A of the roof head lining 42 as well as the case 50.

In this case, in a period from the time of the air bag body 16 expanding to come to a position close to the vehicle front side of the center pillar 18 (i.e., the position indicated by the two-dot chain line in FIG. 1) to the time of the expanded air bag body 16 coming to a position which passes an intermediate portion of the center pillar 18 in the longitudinal direction of the vehicle (i.e., the position indicated by the one-dot chain line in FIG. 1), the air bag body 16 expands toward the interior of the vehicle (i.e., in the direction indicated by arrow A in FIGS. 2 and 3) along the wall potion 61B of the jump-up stand 61. Accordingly, the air bag body 16 does not easily contact the upper end 51A of the center pillar garnish 51, and therefore, large load does not act on the upper end 51A of the center pillar garnish 51.

Further, in this embodiment, since the jump-up stand 61 formed from a plate material is used, it suffices that slight structural change is made. When the air bag body 16 is not mounted on the vehicle, mounting of the jump-up stand 61 becomes unnecessary. Accordingly, the structure of the present embodiment can easily accommodate a state with or without the air bag body 16 mounted and manufacturing thereof is simple. Further, there is no possibility that each strength of the front pillar and the roof side rail deteriorate due to formation of the jump-up stand 61.

Moreover, in the present embodiment, even if the head of a vehicle occupant abuts against the jump-up stand 61 at the time of a collision of the vehicle, the wall portion 61B of the jump-up stand 61 easily plastically deforms as indicated by the two-dot chain line in FIG. 2 to lessen shock to be applied to the head of the vehicle occupant.

Next, a second embodiment of a placement structure for a head-protecting air bag body according to the present invention will be described with reference to FIGS. 5 and 6.

It should be noted that the same members as those of the first embodiment will be denoted by the same reference numerals, and a description thereof will be omitted.

Figure 6:
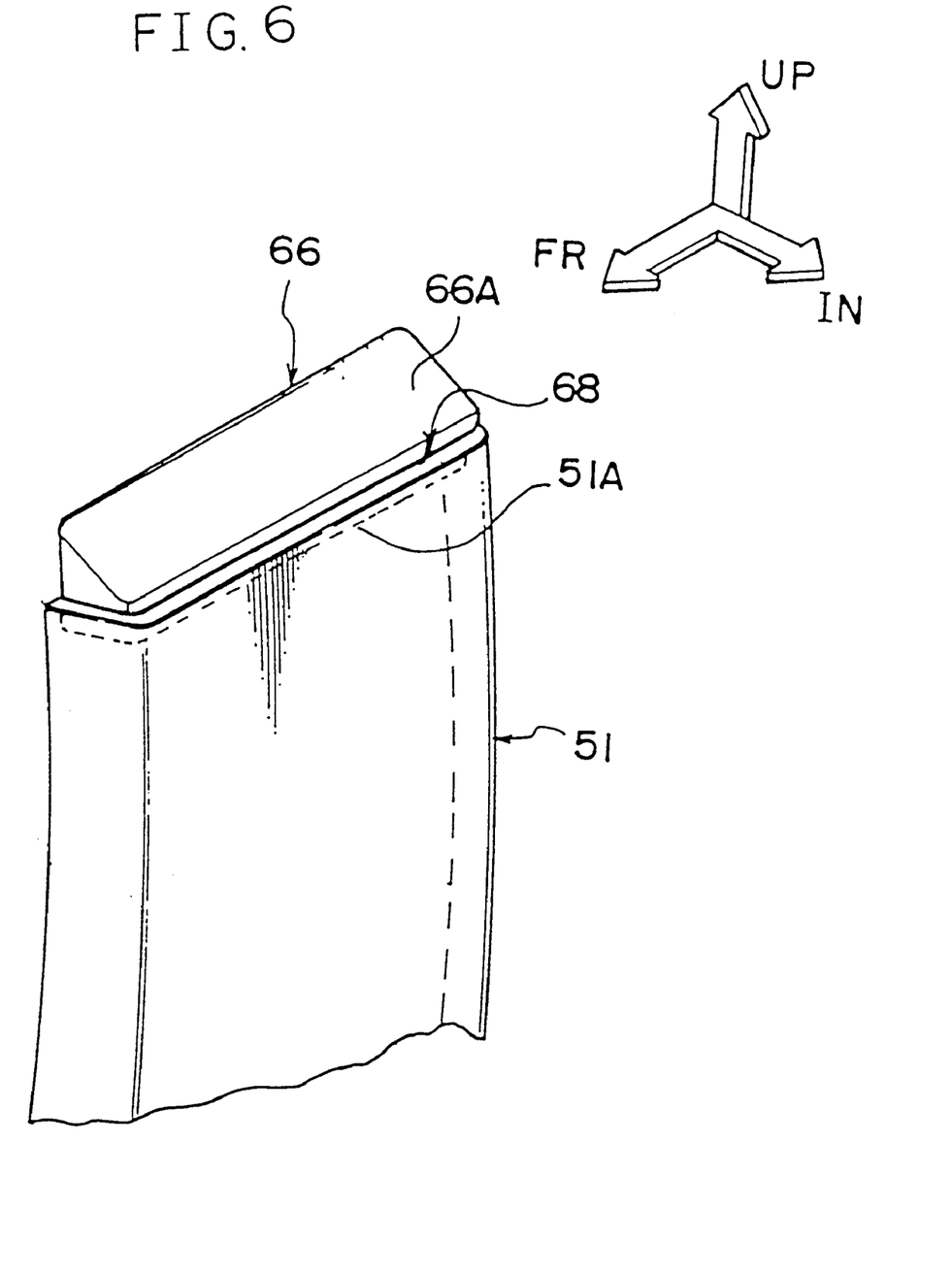
FIG. 6 is an enlarged perspective view as seen from an inner front side in a transverse direction of the vehicle, which shows an upper end portion of a center pillar garnish in the placement structure for a head-protecting air bag body according to the second embodiment of the present invention.

As shown in FIG. 6, in the present second embodiment, a guide portion 66 serving as guide means and generally covering the upper end 51A of the center pillar garnish 51 is formed integrally with the upper end 51A.

Figure 5:
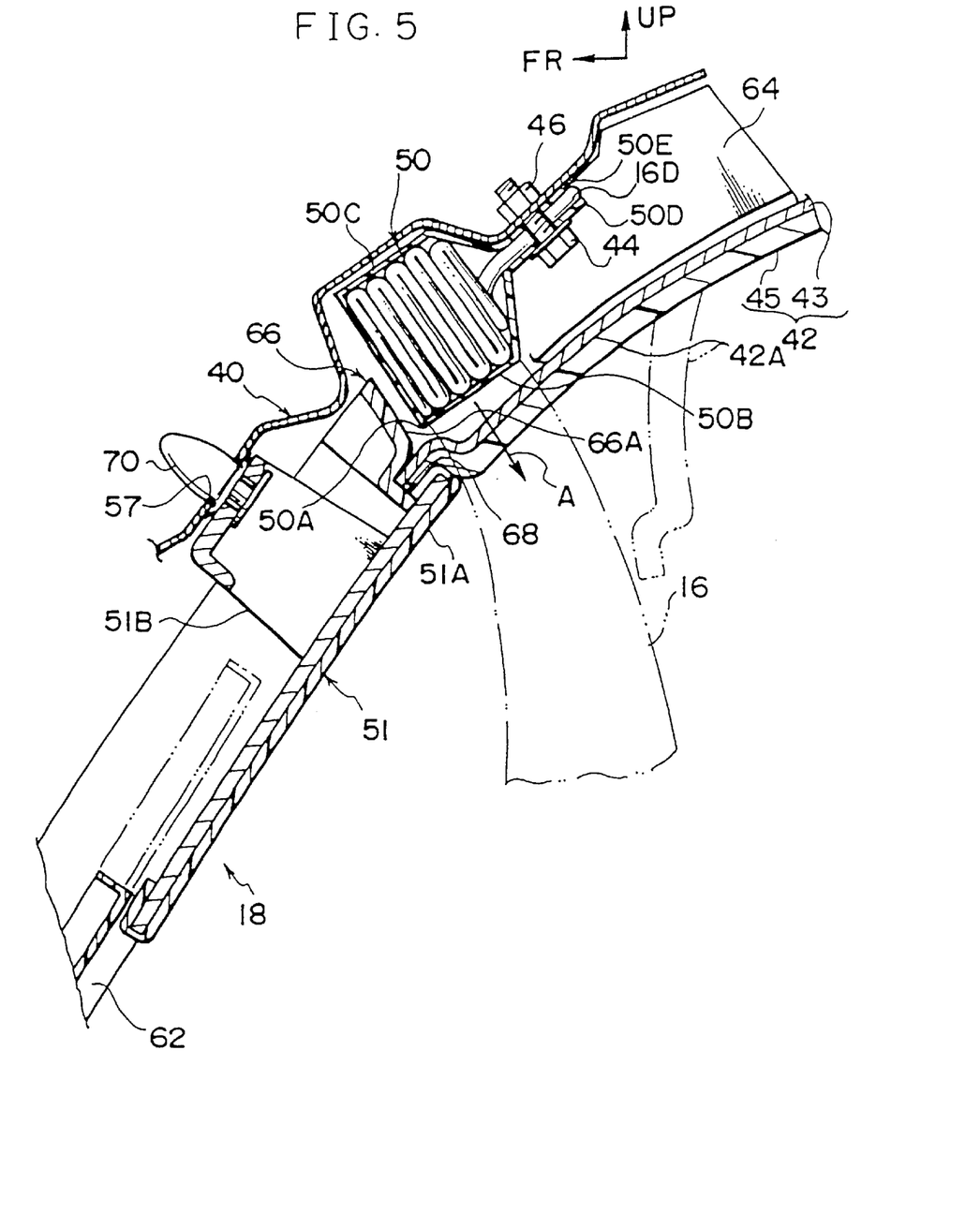
FIG. 5 is a cross-sectional view corresponding to FIG. 2, which shows a placement structure for a head-protecting air bag body according to a second embodiment of the present invention.

As shown in FIG. 5, the guide portion 66 includes a wall portion 66A extending from a rear surface of the upper end 51A of the center pillar garnish 51 to the rail inner panel 40. The wall portion 66A is disposed below the case 50 and substantially parallel to the case 50. Accordingly, during expansion of the air bag body, the air bag body 16 expands toward the interior of the vehicle (i.e., in the direction indicated by arrow A in FIG. 5) along the wall portion 66A of the guide portion 66.

Further, a concave portion 68 serving as connection holding means is formed at a base of the guide portion 66 and an edge of the vehicle transverse direction outer side portion 42A of the roof head lining 42 is inserted and held in the concave portion 68.

Next, operation of the present second embodiment will be described.

In the present second embodiment, when a side-collision load of a predetermined value or more acts on the side portion of the vehicle body, the occurrence of a side-surface collision of the vehicle is detected by the sensor 12. The inflator 14 then operates to eject a predetermined amount of gas. As a result, the air bag body 16 starts to expand, and then further expands similarly to a curtain down to beneath the roof side rail 28 from the front side to the rear side of the vehicle while pushing open the pillar garnish 26 of the front pillar 20 and the vehicle transverse direction outer side portion 42A of the roof head lining 42 as well as the case 50.

In this case, when the air bag body 16 expands to come up to the center pillar 18, the air bag body 16 further expands in the inward direction of the vehicle (i.e., in the direction indicated by arrow A in FIG. 5) along the wall portion 66A of the guide portion 66 formed in the upper end 51A of the center pillar garnish 51. Accordingly, the air bag body 16 does not easily contact the upper end 51A of the center pillar garnish 51, and therefore, a large load does not act on the upper end 51A of the center pillar garnish 51.

In the present second embodiment, the guide portion 66 is formed integrally with the upper end 51A of the center pillar garnish 51, and reduction in cost can be achieved with no increase in the number of parts. Further, the concave portion 68 formed at the base of the guide portion 66 can be used as the connection holding means for the vehicle transverse direction outer side portion 42A of the roof head lining 42.

Although the present invention has been described in detail as related to specific embodiments, it will be understood by those skilled in the art that the present invention is not limited to these specific embodiments thereof and other various modifications may be made within the scope of the present invention. For example, in each of the above-described embodiments, the structure in which the folded air bag body 16 is accommodated within the case 50 is employed. However, the case 50 is not necessarily required, and the air bag body 16 may be maintained in a folded state in such a manner that the folded air bag body 16 is partially wrapped by an easily-broken wrapping material or partially held temporarily by a tape-shaped hook-and-loop fastener.

Further, the placement structure for the head-protecting air bag body according to the present invention can also be applied to an air bag device in which an inflator is disposed at the rear side of the vehicle, for example, at the quarter pillar (C pillar) 30. In this case, the jump-up stand 61 is disposed in a region which faces the upper end 51A of the center pillar garnish 51, preferably in a region from a position overlapping with an assist grip 63 of the roof side rail 28 provided at the rear side of the center pillar 18 to the upper end 51A of the center pillar garnish 51.

What is claimed is:

1. A placement structure for a head-protecting air bag body in a vehicle including a center pillar and a roof side rail, the placement structure comprising:
   a center pillar garnish forming an interior side portion of the center pillar of the vehicle, and having an upper end which is disposed lower than the air bag body when the air bag body is folded and in a direction in which the air bag body is to expand; and
   a guide adjacent a lower side of the air bag body when the air bag body is folded, the guide extending from a position adjacent the roof side rail toward the upper end of the center pillar garnish, the guide being adapted for fastening to the vehicle and being constructed and arranged to control a direction in which the air bag body expands toward the interior of the vehicle so as to prevent the air bag body from being caught by the upper end of the center pillar garnish during expansion, the guide further being constructed and arranged to substantially retain its shape and position during expansion.

2. A placement structure for a head-protecting air bag body according to claim 1, wherein the center pillar garnish is a decorative member of the center pillar.

3. A placement structure for a head-protecting air bag body according to claim 1, wherein, in a transverse cross-sectional view at the center pillar, the guide is disposed at the lower side of the folded air bag body in a center pillar longitudinal direction, and in the vicinity of the upper end of the center pillar garnish.

4. A placement structure for a head-protecting air bag body according to claim 1, wherein the guide is disposed so as to prevent the air bag body from entering into a region between a body panel of the vehicle and the upper end of the center pillar garnish during expansion.

5. A placement structure for a head-protecting air bag body according to claim 1, further comprising a member for maintaining the air bag body in a folded state.

6. A placement structure for a head-protecting air bag body according to claim 1, wherein the air bag body is accommodated over a region from a center pillar garnish to an outer side portion of a roof head lining in a transverse direction of the vehicle with the air bag body having a plurality of folds, said plurality of folds being unfolded substantially in a vertical direction of the vehicle when the air bag is inflated.

7. A placement structure for a head-protecting air bag body according to claim 6, wherein the outer side portion of the roof head lining in the transverse direction of the vehicle opens toward an interior of the vehicle due to expansion force of the air bag body.

8. A placement structure for a head-protecting air bag body according to claim 1, wherein the air bag body is folded in a direction substantially perpendicular to an interior-side surface of a door glass.

9. A placement structure for a head-protecting air bag body according to claim 1, wherein the air bag body is accommodated in a case.

10. A placement structure for a head-protecting air bag body according to claim 9, wherein a V-shaped notch is formed at an inner side of a corner portion of the case, the corner portion being provided at a lower end of the case at an inner side of the transverse direction of the vehicle.

11. A placement structure for a head-protecting air bag body according to claim 9, wherein the case is, together with the air bag body, fastened and fixed to a side portion of a front pillar inner panel toward the interior of the vehicle and to a side portion of a rail inner panel toward the interior of the vehicle.

12. A placement structure for a head-protecting air bag body in a vehicle including a center pillar and a roof side rail, the placement structure comprising: a center pillar garnish forming an interior side portion of the center pillar of the vehicle, and having an upper end which is disposed lower than the air bag body when the air bag body is folded; and
   a guide formed integrally with the upper end of the center pillar garnish and being adjacent a lower side of the air bag body when the air bag body is folded, the guide extending from the upper end of the center pillar garnish toward the roof side rail and being constructed and arranged to control a direction in which the air bag body expands toward the interior of the vehicle so as to prevent the air bag body from being caught by the upper end of the center pillar garnish during expansion, the guide further being constructed and arranged to substantially retain its shape and position during expansion and having a wall portion extending toward the roof side rail.

13. A placement structure for a head-protecting air bag body according to claim 12, further comprising a member for maintaining the air bag body in a folded state.

14. A placement structure for a head-protecting air bag body according to claim 12, wherein said guide generally covers the upper end of the center pillar garnish.

15. A placement structure for a head-protecting air bag body according to claim 12, wherein the wall portion of said guide is disposed below an air bag case and substantially parallel to the air bag case.

16. A placement structure for a head-protecting air bag body according to claim 12, wherein a connection holder, constructed and arranged to hold a lower edge of a roof head lining is formed between the wall portion and the upper end of the center pillar garnish.

17. A placement structure for a head-protecting air bag body according to claim 16, wherein said connection holder is a concave portion.

18. A head-protecting air bag assembly for use in a vehicle having a passenger compartment with opposite sides, a top, bottom, front, and rear, a roof side rail along the passenger compartment top on at least one side, a center pillar disposed between the passenger compartment front and rear, the center pillar extending along said at least one side, from the passenger compartment bottom towards the passenger compartment top, and a center pillar garnish disposed between the center pillar and the vehicle compartment interior, the center pillar garnish having a mounting seat connected to the roof side rail, the air bag assembly comprising:

a folded air bag having mounting portions fastenable along the roof side rail for mounting the air bag thereto, and when mounted to the roof side rail, the air bag extending from the front of the passenger compartment past said center pillar towards the rear of the passenger compartment above said center pillar garnish;

a sensor disposed for detecting an impact to the vehicle of at least a predetermined magnitude;

an inflator having a nozzle connected in fluid communication to the air bag, the inflator ejecting a gas through the nozzle and causing the air bag to expand when the sensor detects said impact;

a guide adjacent a lower side of the air bag and extending from a position adjacent the roof side rail toward an upper end of the center pillar garnish and disposed between the folded air bag and the mounting seat of the center pillar garnish when the folded air bag is mounted to the roof side rail, the guide directing air bag expansion towards the interior of the vehicle.

19. A head-protecting air bag assembly according to claim 18, wherein the center pillar garnish is a decorative member of the center pillar.

20. A head-protecting air bag assembly according to claim 18, wherein, in a transverse cross-sectional view at the center pillar, the guide is disposed at the lower side of the folded air bag body in a center pillar longitudinal direction, and in the vicinity of the upper end of the center pillar garnish.

21. A head-protecting air bag assembly according to claim 18, wherein the guide is disposed so as to prevent the air bag from pressing directly against the mounting seat of the center pillar garnish during expansion.

22. A head-protecting air bag assembly according to claim 18, wherein the mounting seat of the center pillar garnish connects the upper end of the center pillar garnish to the roof side rail.

23. A head-protecting air bag assembly for use in a vehicle having a passenger compartment with opposite sides, a top, bottom, front, and rear, a roof side rail along the passenger compartment top on at least one side, and a center pillar disposed between the passenger compartment front and rear, the center pillar extending along said at least one side, from the passenger compartment bottom towards the passenger compartment top, the assembly comprising:

a folded air bag having mounting portions fastenable along the roof side rail for mounting the air bag thereto, and when mounted to the roof side rail, the air bag extending from the front of the passenger compartment past said center pillar towards the rear of the passenger compartment above a center pillar garnish; a sensor disposed for detecting an impact to the vehicle of at least a predetermined magnitude;

an inflator having a nozzle connected in fluid communication to the air bag, the inflator ejecting a gas through the nozzle and causing the air bag to expand when the sensor detects said impact; the center pillar garnish mountable between the center pillar and the vehicle compartment interior, the center pillar garnish having a mounting seat which connects to the roof side rail when the center pillar garnish is mounted between the center pillar and the vehicle compartment interior;

a guide integrally formed on the center pillar garnish adjacent a lower side of the folded air bag, the guide extending from the upper end of the center pillar garnish toward the roof side rail, the guide including a wall portion extending toward the roof side rail on the upper end of the center pillar garnish and between the mounting seat of the center pillar garnish and the folded air bag when the air bag and the center pillar garnish are mounted to the roof side rail.

24. A head-protecting air bag assembly according to claim 23, wherein the center pillar garnish is a decorative member of the center pillar.

25. A head-protecting air bag assembly according to claim 23, wherein, in a transverse cross-sectional view at the center pillar, the guide is disposed at the lower side of the folded air bag body in a center pillar longitudinal direction, and in the vicinity of the upper end of the center pillar garnish.

26. A head-protecting air bag assembly according to claim 23, wherein the mounting seat of the center pillar garnish connects the upper end of the center pillar garnish to the roof side rail.

27. A head-protecting air bag assembly according to claim 23, wherein said guide is formed integrally with the garnish.

28. A head-protecting air bag assembly according to claim 23, wherein the wall portion of said guide being disposed below the folded air bag.

29. A head-protecting air bag assembly according to claim 23, wherein the vehicle includes a roof head lining having an edge, and the guide includes a connection holder for holding the edge of roof head lining formed at a base of said guide.

30. A head-protecting air bag assembly for use in a vehicle having a passenger compartment with opposite sides, a top, bottom, front, and rear, a roof side rail along the passenger compartment top on at least one side, and a center pillar disposed between the passenger compartment front and rear, the center pillar extending along said at least one side, from the passenger compartment bottom towards the passenger compartment top, the assembly comprising:

a folded air bag having mounting portions fastenable along the roof side rail for mounting the air bag thereto, and when mounted to the roof side rail, the air bag extending from the front of the passenger compartment past said center pillar towards the rear of the passenger compartment above a center pillar garnish; a sensor disposed for detecting an impact to the vehicle of at least a predetermined magnitude;

an inflator having a nozzle connected in fluid communication to the air bag, the inflator ejecting a gas through the nozzle and causing the air bag to expand when the sensor detects said impact; the center pillar garnish mountable between the center pillar and the vehicle compartment interior, the center pillar garnish having a mounting seat which connects to the roof side rail when the center pillar garnish is mounted between the center pillar and the vehicle compartment interior; and a guide integrally formed on the center pillar garnish, the guide including a wall portion extending toward the roof side rail, and disposed on the upper end of the center pillar garnish and between the mounting seat of the center pillar garnish and the folded air bag when the air bag and the center pillar garnish are mounted to the roof side rail;

wherein the vehicle includes a roof head lining having an edge, and the guide includes a connection holder for holding the edge of the roof head lining formed at a base of said guide; and wherein said connection holder is a recess for receiving the edge of the roof head lining.

31. A head-protecting air bag assembly for use in a vehicle having a passenger compartment with opposite sides, a top, bottom, front, and rear, a roof side rail along the passenger compartment top on at least one side, and a center pillar disposed between the passenger compartment front and rear, the center pillar extending along said at least one side, from the passenger compartment bottom towards the passenger compartment top, the assembly comprising:

a folded air bag having mounting portions fastenable along the roof side rail for mounting the air bag thereto, and when mounted to the roof side rail, the air bag extending from the front of the passenger compartment past said center pillar towards the rear of the passenger compartment above a center pillar garnish; a sensor disposed for detecting an impact to the vehicle of at least a predetermined magnitude;

an inflator having a nozzle connected in fluid communication to the air bag, the inflator ejecting a gas through the nozzle and causing the air bag to expand when the sensor detects said impact; the center pillar garnish mountable between the center pillar and the vehicle compartment interior, the center pillar garnish having a mounting seat which connects to the roof side rail when the center pillar garnish is mounted between the center pillar and the vehicle compartment interior; and a guide integrally formed on the center pillar garnish, the guide including a wall portion extending toward the roof side rail, and disposed on the upper end of the center pillar garnish and between the mounting seat of the center pillar garnish and the folded air bag when the air bag and the center pillar garnish are mounted to the roof side rail;

wherein the guide has sufficient structural strength to resist air bag expansion without substantial deformation of the guide.

* * * * *